United States Patent
Furuhashi et al.

(10) Patent No.: US 7,317,587 B2
(45) Date of Patent: Jan. 8, 2008

(54) MAGNETIC DISK DEVICES WITH DATA RECORDING AREAS SET SEPARATELY FOR EACH DEVICE

(75) Inventors: Takao Furuhashi, Kawasaki (JP); Kazuhide Ohba, Kawasaki (JP); Yoshimichi Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/054,589

(22) Filed: Feb. 9, 2005

(65) Prior Publication Data

US 2005/0134994 A1 Jun. 23, 2005

Related U.S. Application Data

(63) Continuation of application No. PCT/JP02/12989, filed on Dec. 12, 2002.

(51) Int. Cl.
*G11B 5/09* (2006.01)
*G11B 21/02* (2006.01)

(52) U.S. Cl. ............................. 360/48; 360/75
(58) Field of Classification Search ..................... None
See application file for complete search history.

(56) References Cited

U.S. PATENT DOCUMENTS

| | | | |
|---|---|---|---|
| 5,596,458 A | 1/1997 | Emo et al. | 360/48 |
| 5,870,237 A | 2/1999 | Emo et al. | 360/48 |
| 5,946,153 A | 8/1999 | Emo et al. | 360/48 |
| 6,005,725 A | 12/1999 | Emo et al. | 360/31 |
| 6,061,195 A | 5/2000 | Wilson et al. | 360/48 |
| 6,084,732 A | 7/2000 | Lee | 360/53 |
| 6,091,559 A | 7/2000 | Emo et al. | 360/48 |
| 6,260,257 B1 * | 7/2001 | Emo et al. | 29/603.09 |
| 6,560,052 B2 * | 5/2003 | Ng et al. | 360/48 |
| 6,611,390 B1 * | 8/2003 | Egan | 360/31 |
| 6,757,119 B2 * | 6/2004 | Leow et al. | 360/31 |

FOREIGN PATENT DOCUMENTS

| | | |
|---|---|---|
| JP | 53-092109 | 8/1978 |
| JP | 58-87118 | 6/1983 |
| JP | 58-155505 | 9/1983 |
| JP | 61-236001 | 10/1986 |
| JP | 3-178004 | 8/1991 |
| JP | 4-301274 | 10/1992 |
| JP | 5-326162 | 12/1993 |
| JP | 10-106179 | 4/1998 |
| JP | 2001-266454 | 9/2001 |

* cited by examiner

*Primary Examiner*—William R. Korzuch
*Assistant Examiner*—Daniell L. Negrón
(74) *Attorney, Agent, or Firm*—Greer, Burns and Crain, Ltd.

(57) ABSTRACT

The present invention relates to a magnetic disk device and provides a magnetic disk device in which data recording areas are separately set based on the inner recording boundary or outer recording boundary of the head measured for each magnetic disk device. When the recording linear (angular) density that has to be attained to ensure a prescribed capacity cannot be attained by the head, the recording linear (angular) density that has to be attained by the head is reduced and the prescribed capacity is realized by expanding the data recording area. A method using a counter-electromotive force generated when the head is moved toward a stopper or ramp load or a method by which the measurements are conducted based on the head position information from the servo signal can be used for measuring the positions of the inner recording boundary and outer recording boundary of the head.

4 Claims, 11 Drawing Sheets

MAGNETIC DISK DEVICES WITH DATA RECORDING AREAS SET SEPARATELY FOR EACH DEVICE

This is a continuation of International Application No. PCT/JP02/12989, filed Dec. 12, 2002.

TECHNICAL FIELD

The present invention relates to magnetic disk devices, and more particularly to disk devices with data recording areas set separately for each device.

BACKGROUND ART

A magnetic disk device has a data recording area, which is set on a disk-like magnetic recording medium rotated around a spindle, and a head, wherein data read/write is conducted by moving the head in the data recording area. The magnetic disk device is also provided with an inner stopper for preventing the head from coming into contact with the spindle during data read/write operation or a ramp load for retracting the head when the device is stopped.

Some of the magnetic disk devices include an outer stopper for preventing the head from contact with the wall surface of the magnetic disk device casing. Furthermore, the ramp load can be located on the inner periphery (spindle) of the disk-like magnetic recording medium or on the outer periphery (wall surface of the disk device casing).

The conventional recording areas have been determined by setting as a constant standard a range in which the head is not brought into contact with the spindle or ramp load during data read/write operation and employing this standard for all the disk drives. The area outside the range serving as the standard is provided as an extra area.

However, a mechanical tolerance such as stopper installation conditions, head installation direction, and ramp load installation position differ between the magnetic disk devices. Therefore, the first problem was that in some disk devices, if a constant standard was applied, the area on the magnetic recording medium that can be used as a data recording area was provided as an extra area.

Further, in the magnetic recording medium a plurality of circular tracks are set concentrically and a plurality of sectors, which are the data recording units, are set in the tracks. Because the length of a circumference is proportional to its radius, the length of the circumference on the outer periphery is larger than that on the inner periphery and the recording linear density (the volume of recorded data per unit length) on the outer periphery is less than the recording linear density on the inner periphery, provided the data transfer ratio is the same. Here, a method for recording the data on the outer periphery with the same recording linear density as on the inner periphery is employed to record a larger volume of data on a single magnetic recording medium.

With this method, the recording angular density of the outer peripheral zone is increased and the recording linear density is made almost uniform between the inner periphery and outer periphery by dividing the magnetic recording medium into a plurality of concentric circular zones by track boundary lines and by varying the frequency used for recording in each zone. A high magnetic angular density means larger number of sectors contained in each zone, on the outer peripheral side.

However, in recent years a demand was created for large-capacity magnetic disk devices, and devices have appeared with a high recording linear density that has to be attained by the head and with a high recording angular density that increases toward the outer peripheral zones to obtain a uniform linear density between the inner periphery and outer periphery. Furthermore, in order to determine the data recording area by employing a constant standard for all the magnetic disk devices, it was necessary to set automatically the recording linear (angular) density that has to be attained by the head in order to realize the prescribed capacity and to select heads according to the same standard for all the heads.

On the other hand, the head production technology has not been accordingly advanced, and at the present level of head production technology the produced heads have a large spread of characteristics. Therefore, the second problem was that the degradation of yield in head production caused by the fact that the recording linear (angular) density of the head did not meet the required standard could not be improved.

DISCLOSURE OF THE INVENTION

It is a first object of the present invention to provide disk devices in which data recording areas are set separately for each device. It is a second object of the present invention to prevent the degradation of head production yield by expanding the data recording area and decreasing the recording angular density that has to be attained, when the recording linear (angular) density that has to be attained to ensure the prescribed capacity by the head cannot be realized.

In order to attain the above-described objects, the invention of claim 1 provides a disk device comprising a disk medium having set therein a recording area divided by zone boundaries into a plurality of zones in the radial direction, and a head moving over the disk medium and reading or writing the data from or on the disk medium, wherein when the movability range of the head is wider than the recording area that was set, the recording area in the disk medium is expanded and new zone boundaries are set.

The above-described objects are preferably attained with the disk device according to claim 1, wherein the recording frequency of the outer peripheral zone is equal to or higher than the recording frequency of the inner peripheral zone, and when the movability range of the head is wider on the inner peripheral side than the recording area that was set, the zone boundaries are shifted to the outer peripheral side.

Further, in order to attain the above-described objects, in one embodiment the invention provides a disk device comprising a disk medium having a recording area divided by zone boundaries into a plurality of zones with individually set recording frequencies in the radial direction, and a first head and a second head which are provided correspondingly to each recording surface of a plurality of recording surfaces present in the disk medium and serving to conduct reading or writing of data from or on the disk medium, wherein the highest recording frequency on the recording surface corresponding to the first head is lower than the highest recording frequency on the recording surface corresponding to the second head.

In accordance with the invention, the above-described objects are preferably attained by providing the disk device, wherein the recording frequency in the n-th zone (n is a natural number) from the innermost peripheral side of the recording surface corresponding to the first head is equal to the recording frequency of the (n−1)-th zone from the innermost peripheral side of the recording surface corresponding to the second head.

Further, in accordance with an embodiment of the invention, the above-described objects are preferably attained by providing the disk device, wherein the number of zones on the recording surface corresponding to the first head is equal to the number of zones on the recording surface corresponding to the second head.

Further, the above-described objects are preferably attained by providing the disk device, wherein the recording frequency for the innermost peripheral side of the recording surface corresponding to the first head is equal to the recording frequency of the zone adjacent to the innermost peripheral zone.

Further, the above-described objects are preferably attained by providing the disk device, wherein the recording surface corresponding to the first head and the recording surface corresponding to the second head are present on mutually different disk media.

Further, in order to attain the above-described objects, another embodiment of the invention provides an array of a plurality of disk devices, wherein each disk device comprises a disk medium having set therein a recording area divided in the radial direction by zone boundaries into a plurality of zones each including a plurality of tracks, and a head for reading or writing the data from or on the disk medium, and wherein the number of tracks of the n-th (n is a natural number) zone from the innermost peripheral side of the disk medium in the first disk device contained in the plurality of disk devices is larger than the number of tracks in the n-th zone from the innermost peripheral side of the disk medium in the second disk device contained in the plurality of disk devices, and the number of tracks in the (n+m)-th (m is a natural number) zone from the innermost peripheral side of the disk medium in the first disk device is smaller than the number of tracks in the (n+m)-th zone from the innermost peripheral side of the disk medium in the second disk device.

Further, in accordance with the invention, the above-described objects are preferably attained by providing the array of disk devices, wherein the movability range of the head in the first disk device is wider than the movability range of the head in the second disk device.

Further, the above-described objects are preferably attained by providing the array of disk devices, wherein the number of tracks in the innermost peripheral zone in the first disk device is larger than the number of tracks in the innermost peripheral zone in the second disk device, and the number of tracks in the outermost peripheral zone in the first disk device is smaller than the number of tracks in the outermost peripheral zone in the second disk device.

Further, in order to attain the above-described objects, an embodiment of the invention provides a method for manufacturing a disk device comprising a disk medium having set therein a recording area divided by zone boundaries into a plurality of zones in the radial direction, and a head moving over the disk medium and reading or writing the data from or on the disk medium, comprising: measuring a movability range of the head, expanding the recording area of the disk medium when the movability range is wider than a standard value and setting new zone boundaries.

Further, the above-described objects are preferably attained by providing the method for manufacturing a disk device, further comprising shifting said zone boundaries to the outer peripheral side when the recording frequency of the outer peripheral zone is equal to or higher than the recording frequency of the inner peripheral zone, and when the movability range of the head is wider on the inner peripheral side than the recording area that was set.

With the above-described preferred embodiments, the data recording area can be set for each disk device and the magnetic recording medium can be used with good efficiency. Furthermore, with another aspect of the preferred embodiments of the present invention, the recording angular density that has to be attained by the head can be decreased and the degradation of production yield caused by the head can be prevented by expanding the data recording area.

BEST MODE FOR CARRYING OUT THE INVENTION

The embodiments of the present invention will be described below with reference to the appended drawings. However, the technological scope of the present invention is not limited to those embodiments and includes the inventions described in patent claims and equivalents thereof.

Figure 1:
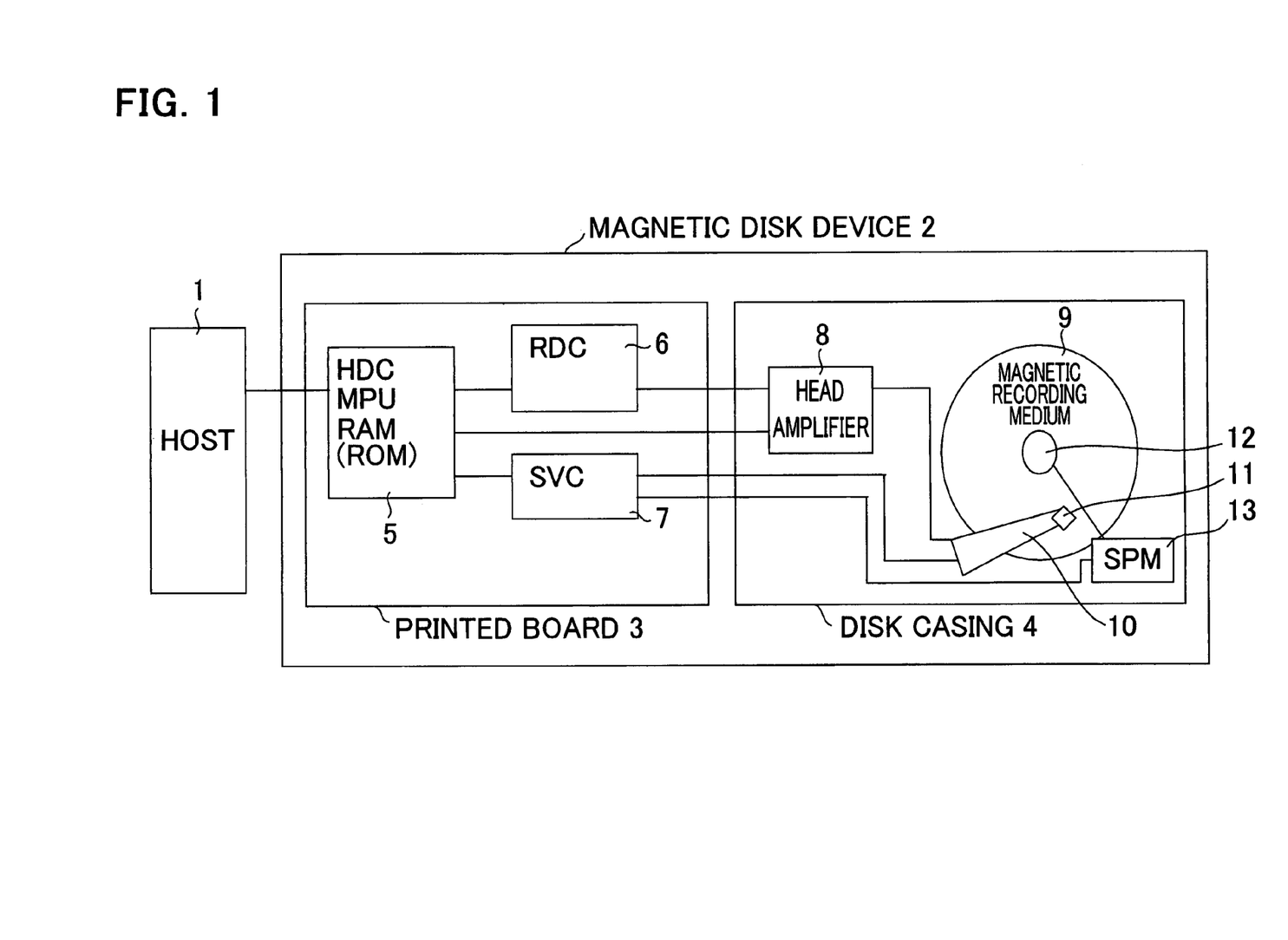
FIG. 1 shows a configuration example of the magnetic disk device in accordance with the present invention.

FIG. 1 illustrates a structural example of the magnetic disk device in accordance with the present invention. A magnetic disk device 2 can be divided into a printed board 3 and a disk housing 4. Write and read commands and write and read data are exchanged between the magnetic disk device and a host 1.

A microprocessor unit (MPU) of a controller 5 for conducting the interface control with the host 1 controls, when a write command and write data are received, a hard disk controller (HDO) and the hard disk controller adds an error correction code to the data and sends them to a read-write channel (RDC) 6. The read-write channel 6 sends for a head amplifier 8 a write signal obtained by performing a code modulation of modulating the write data.

The head amplifier 8 amplifies the current of the write signal and writes the data with a head 11. When the data is written, the microprocessor unit (MPU) controls the head 11 to the write position based on the position information of the head 11 obtained by controlling a servo controller (SVO) 7.

When the read command is received, the signal read by the head 11 is amplified with the head amplifier 8. Code demodulation is performed to the amplified signal with the read-write channel 6 and demodulated data is sent to the host 1 with the microprocessor unit MPU, which controls the interface control, after the error correction processing with the hard disk controller (HDC) has been conducted.

The head 11 is mounted on the distal end of an arm 10 and moves together with the arm 10. The operation of the arm 10 is conducted by controlling the electric current flowing in a coil (not shown in the figure) installed on the arm 10. A magnetic recording medium 9 is rotated by the rotation of a spindle 12 controlled by a spindle motor 13.

Figure 2:
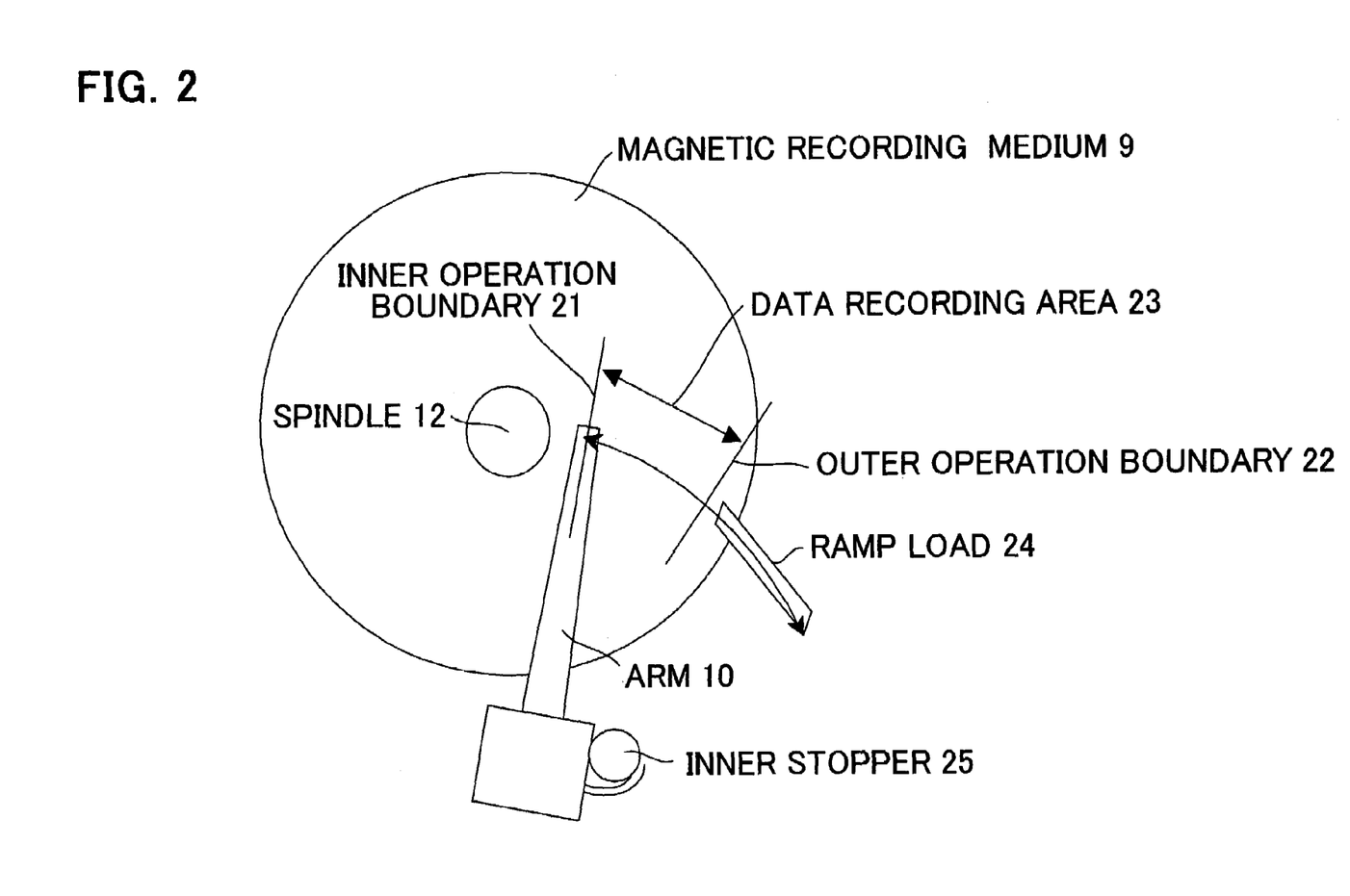
FIG. 2 shows a magnetic recording medium in an embodiment of the present invention.

FIG. 2 shows the magnetic recording medium 9 of an embodiment of the present invention. As shown in FIG. 2, the range in which a head (not shown in the FIG. 2), which is attached to the distal end of the arm 10, can access the data recorded on the magnetic recording medium 9 is measured and this range is considered as a data recording area 23. In the present specification, with regard to the magnetic recording medium 9, the side of the spindle 12 shown in FIG. 2 is called an inner peripheral side and the side of the ramp load 24 in FIG. 2 is called an outer peripheral side.

The boundary of the accessible range on the inner peripheral side is called inner recording boundary 21 and the boundary on the outer peripheral side is called an outer recording boundary 22. The data recording area 23 is an area surrounded by the inner recording boundary 21 and outer recording boundary 22. As shown in FIG. 2, an inner stopper 25 is used to prevent the contact with the spindle 12, and a distance when the head approaches the spindle in the closest manner is measured. The inner recording boundary 21 is set based on the measured distance. Similarly, a distance when the head approaches the ramp load 24 in the closest manner is measured and the outer recording boundary 22 is set based on the measured distance.

Figure 3:
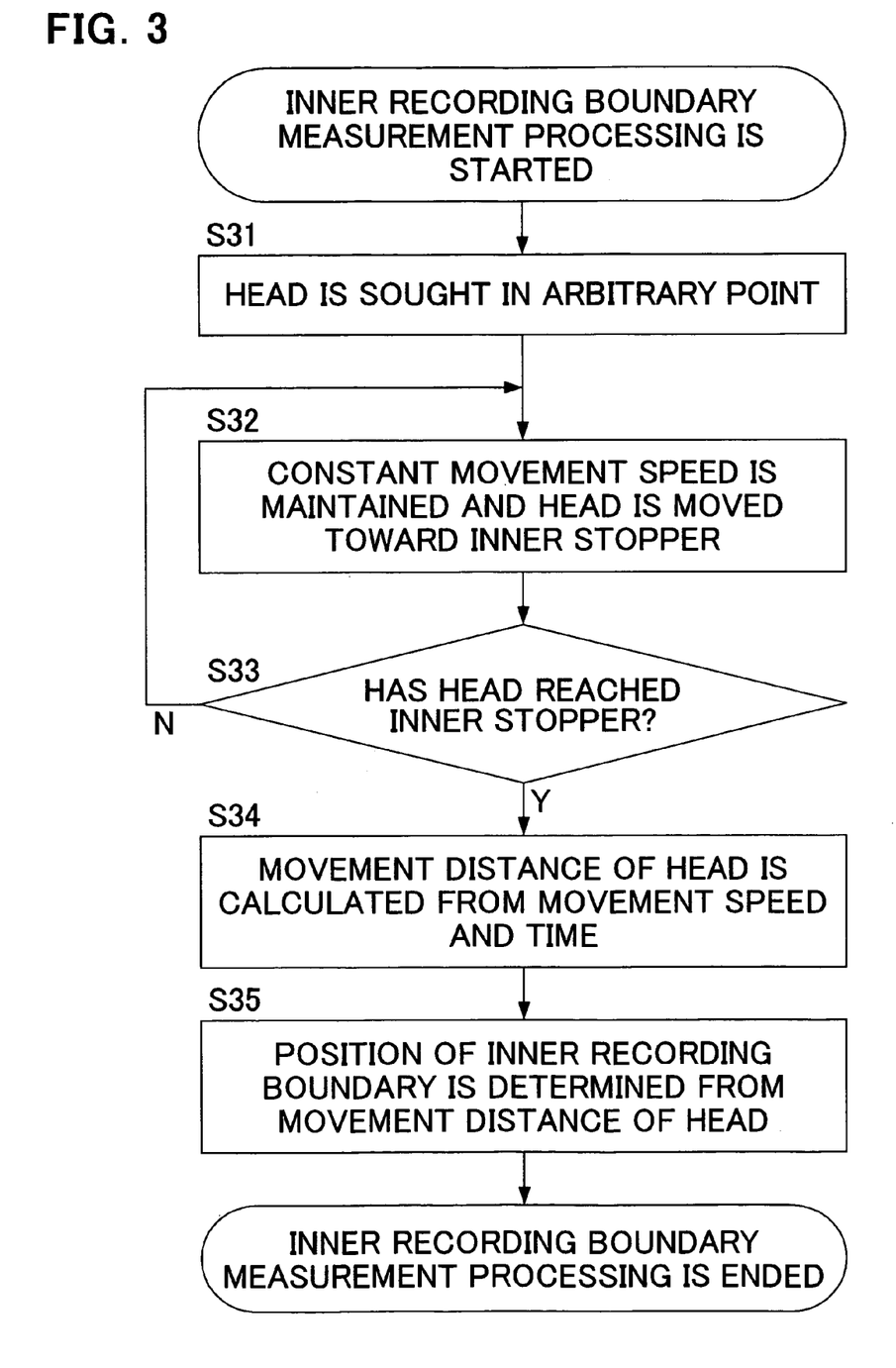
FIG. 3 is flow chart illustrating the inner recording boundary measurement processing.

FIG. 3 is a flow chart showing an inner recording boundary measurement processing in an embodiment of the present invention. First, the head is moved in an arbitrary point on the magnetic recording medium 9 (S81). At this time, the position information and time information of this point are recorded. Then, the head is moved toward an inner stopper 25, while a constant movement speed is being maintained (S32). This means that the head is caused to approach the spindle till the inner stopper starts to operate. If the head is moved, a counter-electromotive force is generated by the arm 10 moving in a magnetic field. The relationship $v=aV$ (a is a constant coefficient that can be found from the magnetic flux density and the coil length of the arm 10) is valid between the counter-electromotive force, $V$, and the movement speed, $v$, of the arm 10. Thus, a constant movement speed of the arm 10 can be maintained by measuring the counter-electromotive force generated during the movement and maintaining it at a constant level.

Then, a decision is made as to whether the head has reached the inner stopper (S33). If the head has reached the inner stopper, the head movement is terminated by the inner stopper. The decision is made by using the fact that the counter-electromotive force undergoes explicit changes at this time. If the head has not reached the inner stopper, the step S32 is continued.

Once the head has reached the inner stopper, the head movement distance is calculated from the movement speed and movement time (S34). The movement speed, is calculated from the generated counter-electromotive force and the constant coefficient, a. The movement time is found by comparing the time information recorded in step S31 and the time information relating to this point of time. The movement distance is then found by multiplying the movement speed, $v$, by the movement time, $t$.

The position of the inner recording boundary is then obtained from the movement distance of the head (S35). The inner recording boundary in which the head can access the data on the magnetic recording medium during data read/write operation can be found from the position information recorded in step S31 and the movement distance of the head found in step S34.

Further, referring to FIG. 3, the movement distance was found from the time required for the movement to the inner stopper when the constant movement speed of the arm 10 is maintained. However, even if the movement speed of the arm 10 changes, the movement distance can be appropriately found by recording the movement speed for each constant interval and integrating over time after the inner stopper has been reached.

If a servo signal indicating the position information of the head has been recorded on the magnetic recording medium 9 (this case is not illustrated by FIG. 2), the inner recording boundary can be found based on the position information recorded in step S31 and the position information of the head from the servo signal obtained directly before the inner stopper has been reached. Furthermore, when a ramp load has been provided on the inner peripheral side, instead of the inner stopper, the ramp load can be substituted for the inner stopper shown in FIG. 3 to comprehend the process in FIG. 3.

Figure 4:
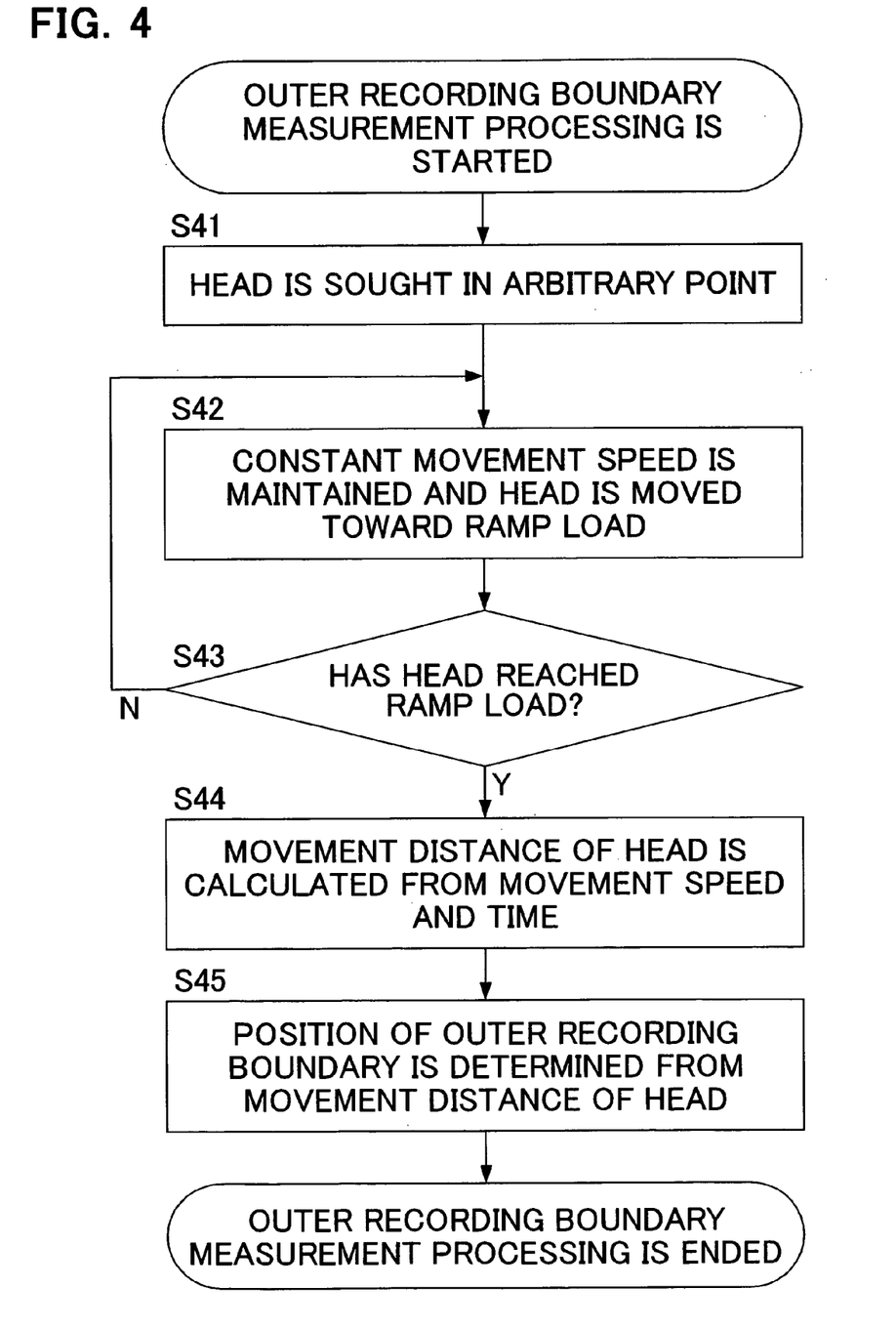
FIG. 4 is a flow chart illustrating the outer recording boundary measurement processing.

FIG. 4 is a flow chart illustrating the outer recording boundary an outer recording boundary measurement processing in an embodiment of the present invention. First, the head is moved in an arbitrary point on the magnetic recording medium 9 (S41). At this time, the position information and time information of this point are recorded. Then, the head is moved toward the ramp load, while a constant movement speed is being maintained (S42). This means that the head is caused to approach the ramp load till the ramp load is reached. The method for maintaining a constant movement speed is identical to that of step S32.

Then, a decision is made as to whether the head has reached the ramp load (S43). The decision is made by using the fact that the counter-electromotive force undergoes explicit changes when the head has reached the ramp load. If the head has not reached the ramp load, the step S42 is continued.

Once the head has reached the ramp load, the head movement distance is calculated from the movement speed and movement time (S44). The method for calculating the distance is identical to that of step S34. Then, the position of the outer recording boundary is obtained from the movement distance of the head (S45). The outer recording boundary in which the head can access the data on the magnetic recording medium during data read/write operation can be found from the position information recorded in step S41 and the movement distance of the head found in step S44.

Further, referring to FIG. 4, the movement distance was found from the time required for the movement to the ramp load when the constant movement speed of the arm 10 is maintained. However, even if the movement speed of the arm 10 changes, the movement distance can be appropriately found by recording the movement speed for each constant interval and integrating over time after the ramp load has been reached.

When a servo signal indicating the position information of the head has been recorded on the magnetic recording medium 9 (this case is not illustrated by FIG. 2), the outer recording boundary can be found based on the position information recorded in step S41 and the position information of the head from the servo signal obtained directly before the ramp load has been reached. Furthermore, when an outer stopper has been provided instead of the ramp load, the outer stopper can be substituted for the ramp load shown in FIG. 4 to comprehend the process in FIG. 4.

In the embodiment of the present invention the data recording area is determined by measuring the range in which the head can access the data on the magnetic recording medium for each disk device. The area that has been heretofore provided as an unusable extra area can thus be included into the data recording area, thereby making it possible to expand the data recording area and use the magnetic recording medium with good efficiency. The recording boundary can be measured by using also the servo signal recorded on the magnetic recording medium. Furthermore, the counter-electromotive force generated when the head is moved can be also used.

The first employment mode of the present invention will be described below. The first employment mode relates to the case in which a new data recording area is set, this area being wider than the conventional data recording area, as a result of setting the inner recording boundary further near on the spindle 12 side than in the conventional systems.

Figure 5:
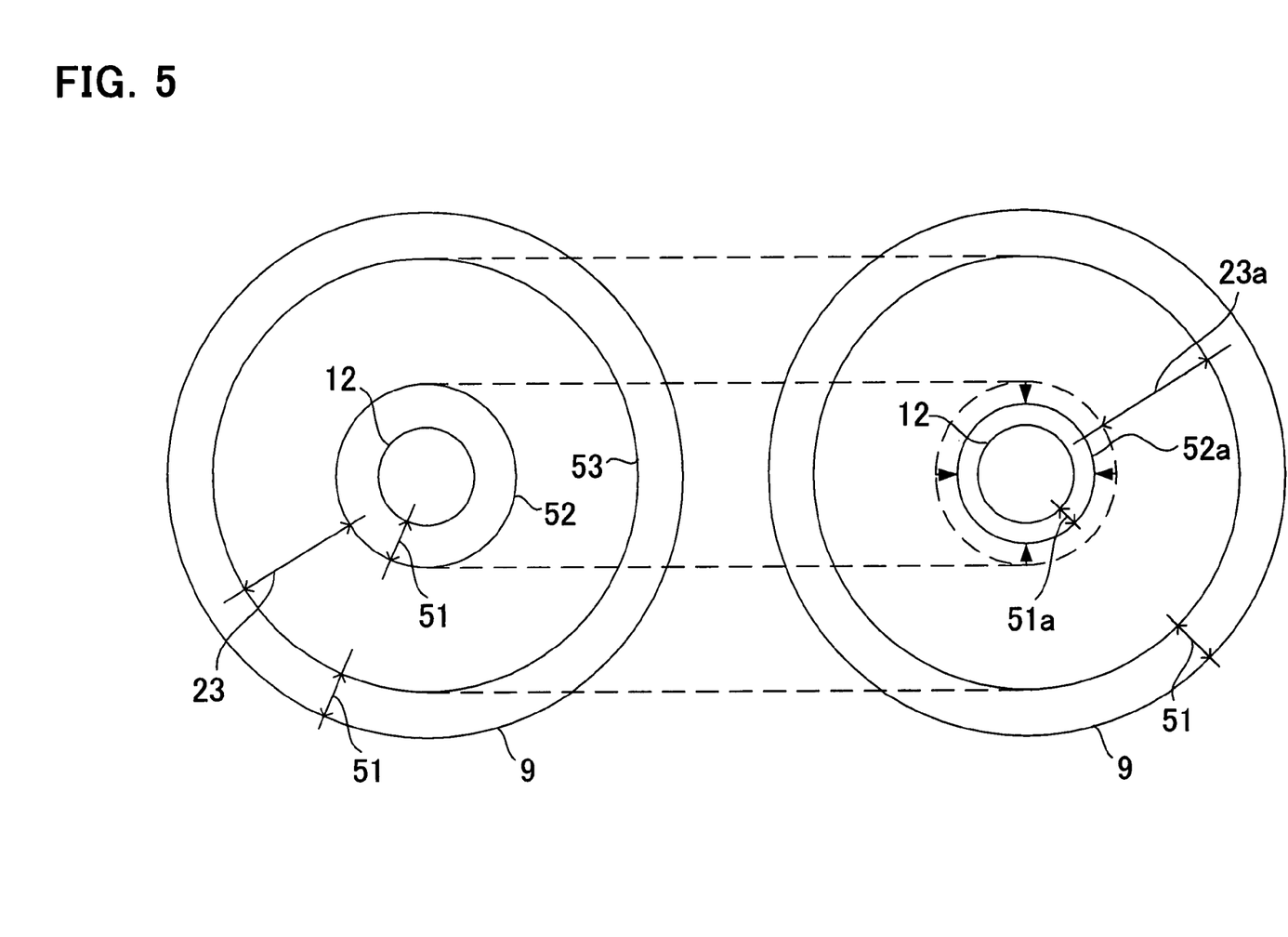
FIG. 5 illustrates a first employment mode.

FIG. 5 illustrates the first employment mode. An example of the conventional data recording area is shown on the left side of FIG. 5. There are two extra areas 51 at an inner peripheral side close to the spindle 12 and at the outer peripheral side. An area surrounded by the inner track 52 and outer track 53 of the data recording area in the magnetic recording medium 19 serves as a data recording area 23. In the conventional example, the inner track 52 and outer track 53 are determined by employing a constant standard in all the disk devices.

An example in which the data recording area is expanded toward the spindle 12 by conducting the inner recording boundary measurement processing is shown on the right side of FIG. 5. Because the measured inner recording boundary is further to the spindle side that the inner track 52 of the data recording area 23 shown on the left side of FIG. 5, the position of the measured inner recording boundary serves as an inner track 52a and the data recording area 23a is expanded toward the spindle. Further, the extra area 51a on the spindle side is reduced by comparison with the extra area 51 on the spindle side shown on the left side of FIG. 5a.

With the first employment mode, the data recording area is expanded on the inner peripheral side, the capacity can be increased, and the magnetic recording medium can be used effectively.

Figure 6:
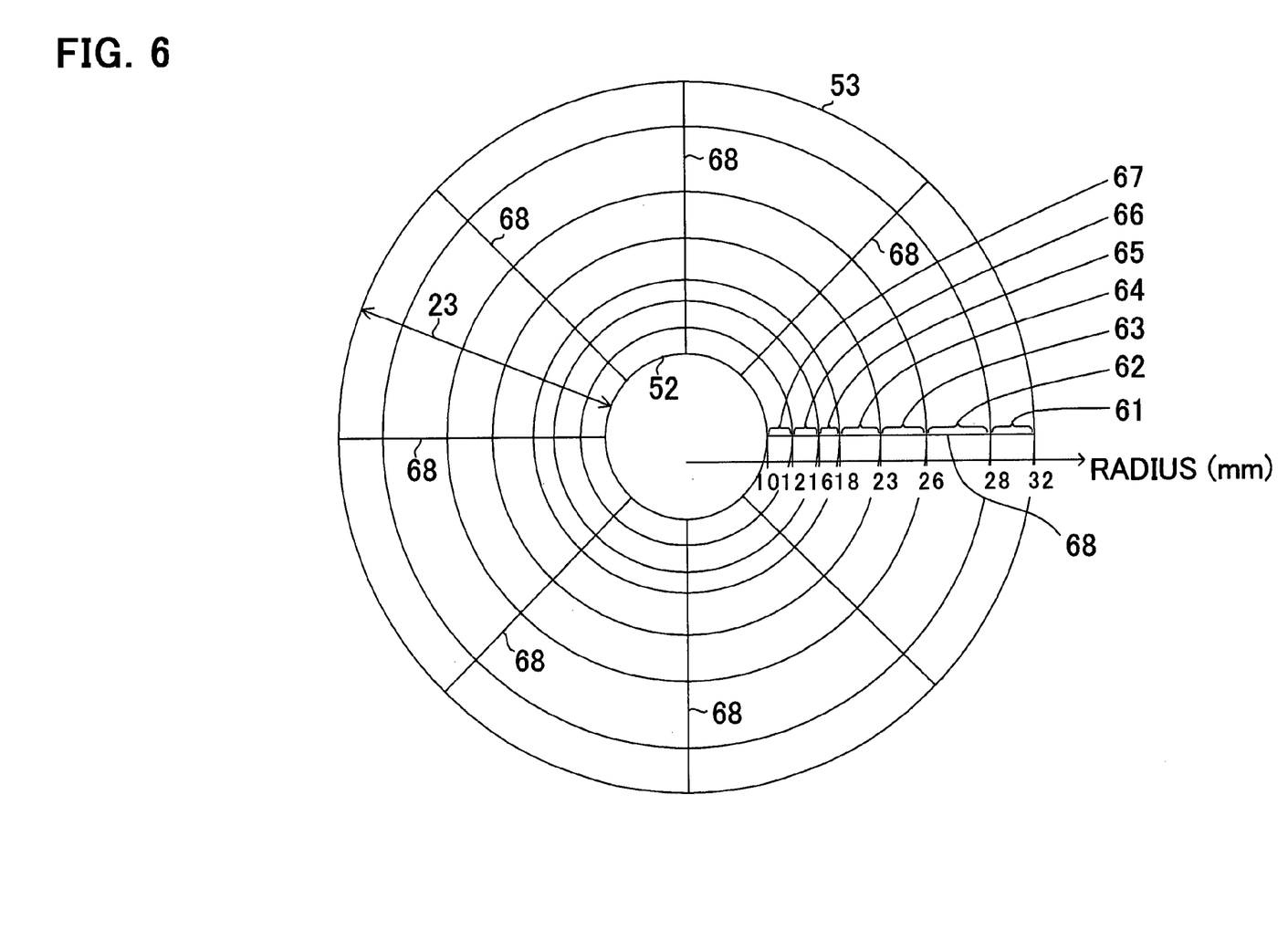
FIG. 6 shows an example of the conventional data recording area.

FIG. 6 illustrates an example of the conventional data recording area for explaining the second and third employment modes. In FIG. 6, seven zones are depicted in the data recording area 23 bounded by the inner track 52 and outer track 53. The area from a radius of 10 mm to a radius of 12 mm is a seventh zone 67, from a radius of 12 mm to a radius of 16 mm—a sixth zone 66, from a radius of 16 mm to a radius of 18 mm—a fifth zone 65, from a radius of 18 mm to a radius of 23 mm—a fourth zone 64, from a radius of 23 mm to a radius of 26 mm—a third zone 63, from a radius of 26 mm to a radius of 28 mm—a second zone 62, and from a radius of 28 mm to a radius of 32 mm—a first zone 61.

A recording angular density that has to be attained by the head is set for each zone to ensure the prescribed capacity. The highest recording angular density is set for the first zone on the outer peripheral side and the recording angular density decreases with the increase in the zone number toward the seventh zone. The distance from the center is presented in millimeter units on the boundary of each zone to establish the correspondence with the below-described recording angular density distribution diagram. In the conventional systems, the inner track 52 and outer track 53 are determined by employing a constant standard in all the disk devices.

Further, a total of eight servo gates 68 are depicted in FIG. 6. Servo signals indicating the position information are recorded in the servo gates 68. If the head passes above the servo gate, the servo signal is transmitted to the servo controller 7 shown in FIG. 1 and the position information is processed with the microprocessor unit MPU of the controller 5.

The second employment mode will be described below. The second employment mode represents an example in which the data recording area is expanded and zone boundaries are modified to ensure the same prescribed capacity at a recording linear (angular) density lower than the reducing line (angular) density set to attain the prescribed capacity.

Figure 7:
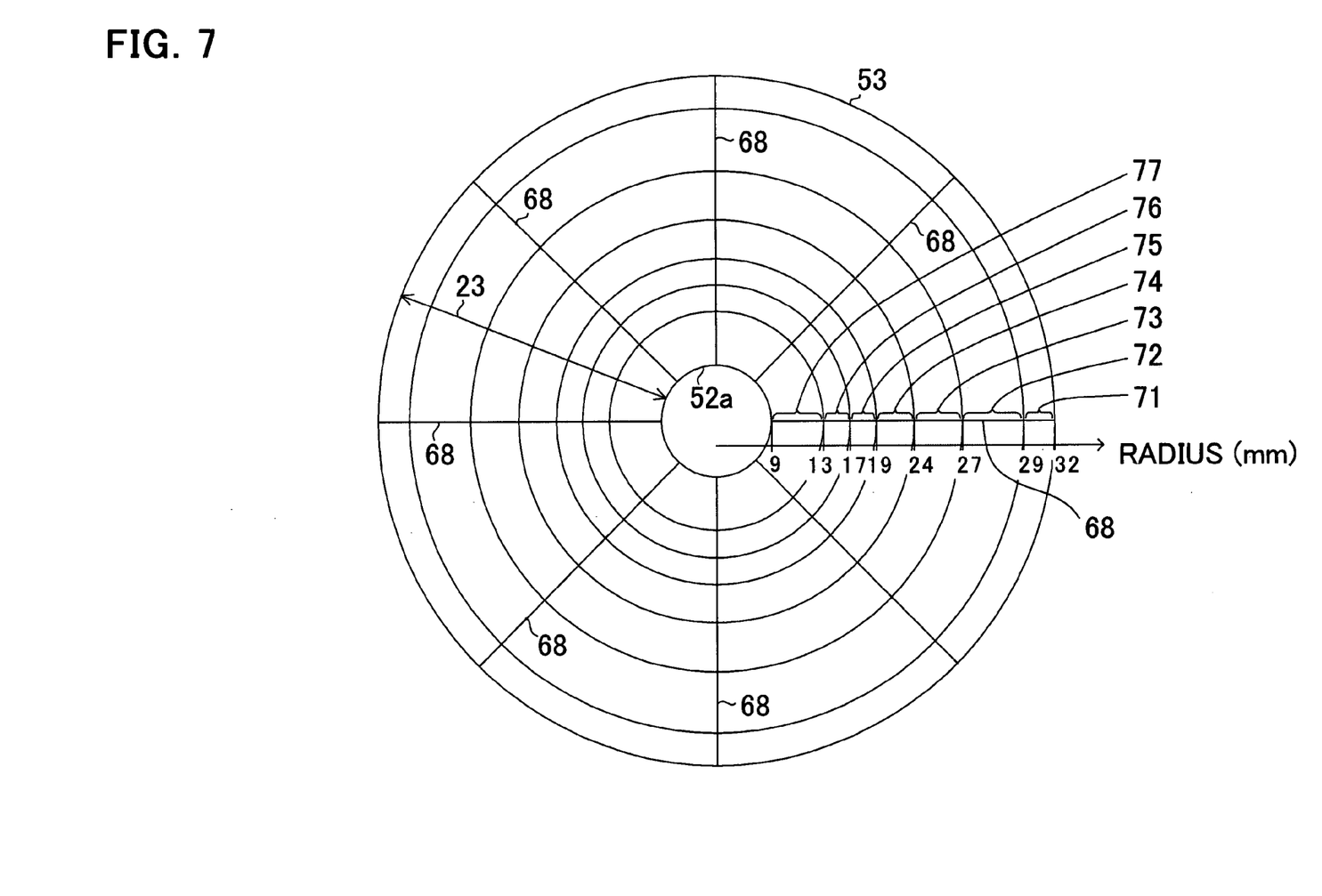
FIG. 7 shows an example of data recording area in the second employment mode.

FIG. 7 illustrates an example of the data recording area in the second employment mode. As shown in FIG. 7, as a result of the inner recording boundary measurement processing illustrated by FIG. 3, the inner track 52a shown in FIG. 7 is located 1 mm on the inside from the inner track 52 shown in FIG. 6 and the data recording area is expanded toward the spindle. A seventh zone 77 is set in the area from a radius of 9 mm to a radius of 13 mm, a sixth zone 76 is set in the area from a radius of 13 mm to a radius of 17 mm, a fifth zone 75 is set in the area from a radius of 17 mm to a radius of 19 mm, a fourth zone 74 is set in the area from a radius of 19 mm to a radius of 24 mm, a third zone 73 is set in the area from a radius of 24 mm to a radius of 27 mm, a second zone 72 is set in the area from a radius of 27 mm to a radius of 29 mm, and a first zone 71 is set in the area from a radius of 29 mm to radius of 32 mm.

The zone boundaries are set to match the expansion of the data recording area. A method for setting the zone boundaries cannot be defined in a general manner because the track pitch, which is the distance between the tracks, differs between the vendors or products. As an example, when the track pitch is 0.4 μm, if the data recording area is expanded by 1 mm, a total of 2,500 tracks are ensured. Then, a calculation is conducted by which the 2,500 tracks, which represent the increase, are allocated based on the recording linear (anguler) density that can be attained by the head and the desired prescribed capacity.

Figure 8:
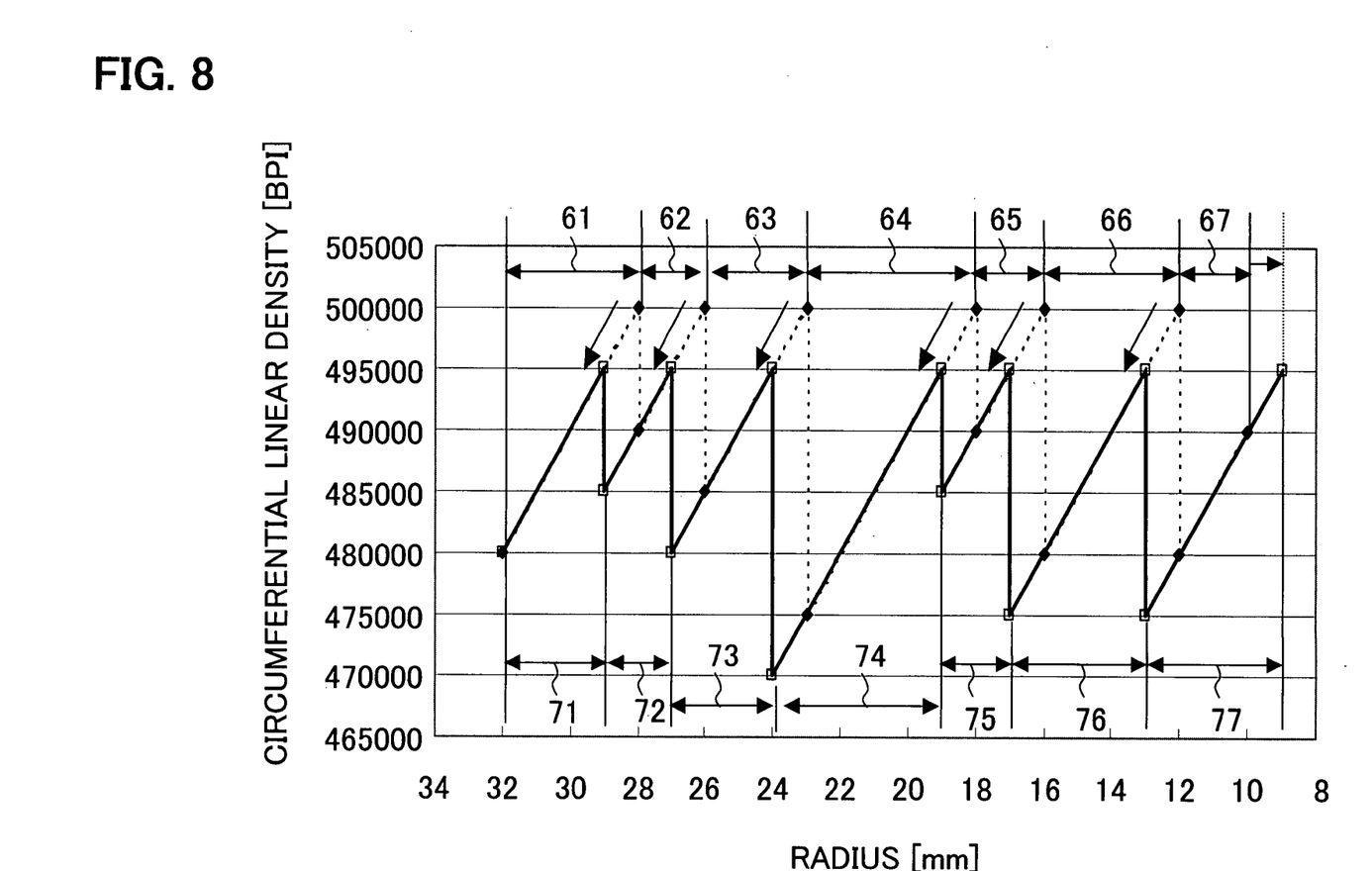
FIG. 8 shows an example of recording linear density distribution in the second employment mode.

FIG. 8 shows an example of the recording linear density distribution in the second employment mode. The dotted line represents the recording linear density that is set for the zone boundaries shown in FIG. 6 and the solid line represents the recording linear density that is set for the zone boundaries shown in FIG. 7. As shown in FIG. 8, the data recording area on the spindle side was expanded by 1 mm and the boundaries of each zone were reset. As a result, the maximum value of the recording linear density that has to be attained in each zone is decreased from 500,000 BPI (Bit Per Inch) to 495,000 BPI.

In the second employment mode, the recording boundary of the head is measured for each disk device and the data recording area is expanded, thereby decreasing the recording linear (angular) density that has to be attained by the head to ensure the prescribed capacity. As a result, the degradation of the head production yield can be prevented.

The third employment mode will be described below. The third employment mode represents an example in which the data recording area is expanded and setting of one inner zone is used without changing the zone boundaries in order to ensure the same capacity at a recording linear (angular) density lower than the recording linear (angular) density that is set to attain the prescribed capacity.

Figure 9:
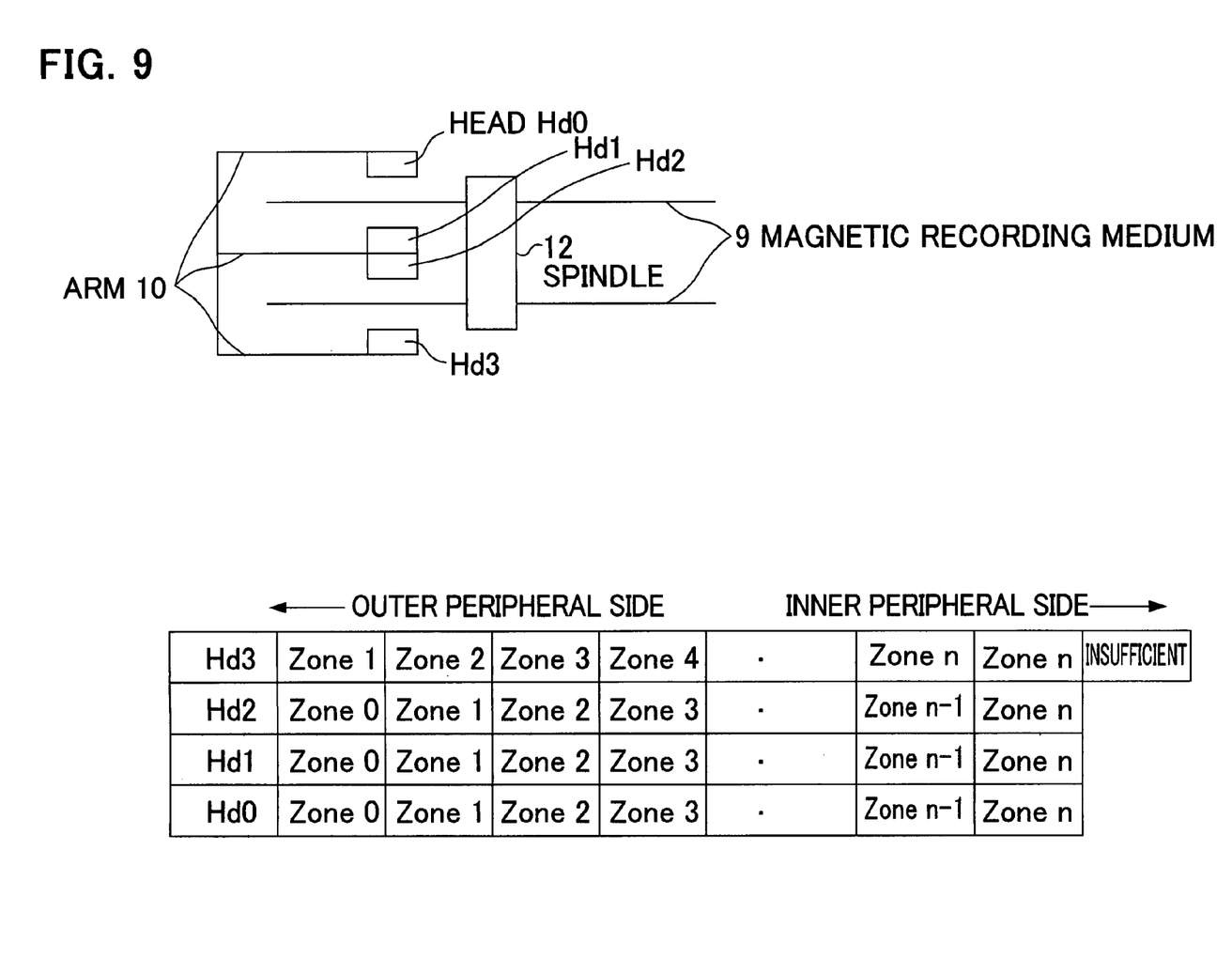
FIG. 9 shows an example of zone allocation determined by head characteristics.

FIG. 9 shows an example of zone allocation based on head characteristics, this example serving to explain the third employment mode. As shown in FIG. 9, when one of a plurality of heads present in a single magnetic disk device cannot attain the recording linear (angular) density that has to be attained to ensure the prescribed capacity, the recording angular density of each zone is set to one or no less than two lower recording angular densities on the inner side and the insufficient capacity is compensated by the expansion of the data recording area.

The upper drawing of FIG. 9 shows a configuration in which two magnetic recording media are provided on the spindle 12 and four heads (Hd0 through Hd3) are supported on the arm. As shown in the lower drawing of FIG. 9, the data recording area is expanded on the inner side by conducting the inner recording boundary measurement processing illustrated by FIG. 3 in the magnetic recording medium used by the head Hd3 when the head Hd3 has poor characteristics and then the recording angular density which is set in each zone is shifted by one inner recording angular density. Because the inner recording angular density is lower than the outer recording angular density, the head Hd3 does not become defective and yield degradation is prevented.

Figure 10:
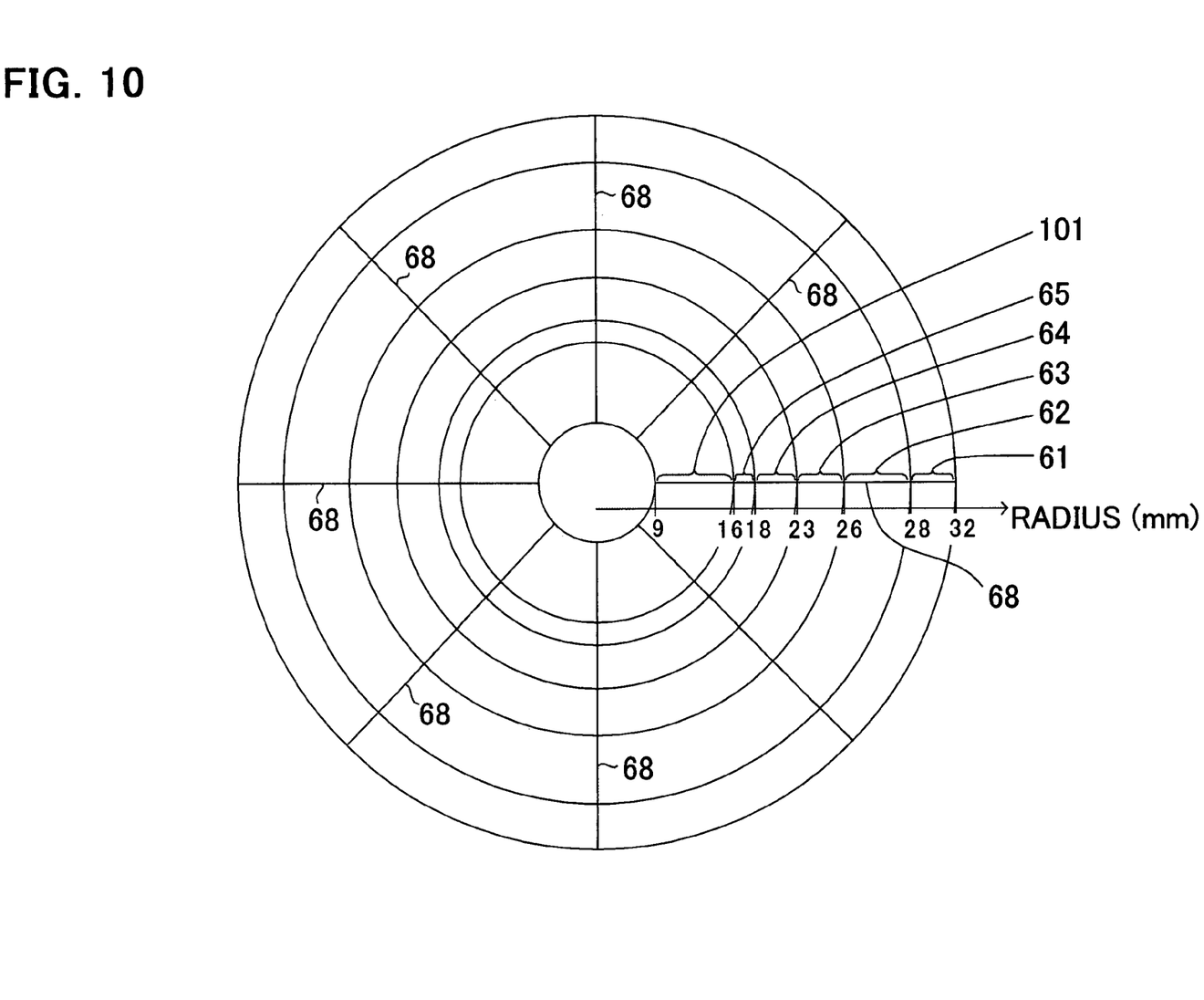
FIG. 10 shows an example of data recording area in the third employment mode.
Figure 11:
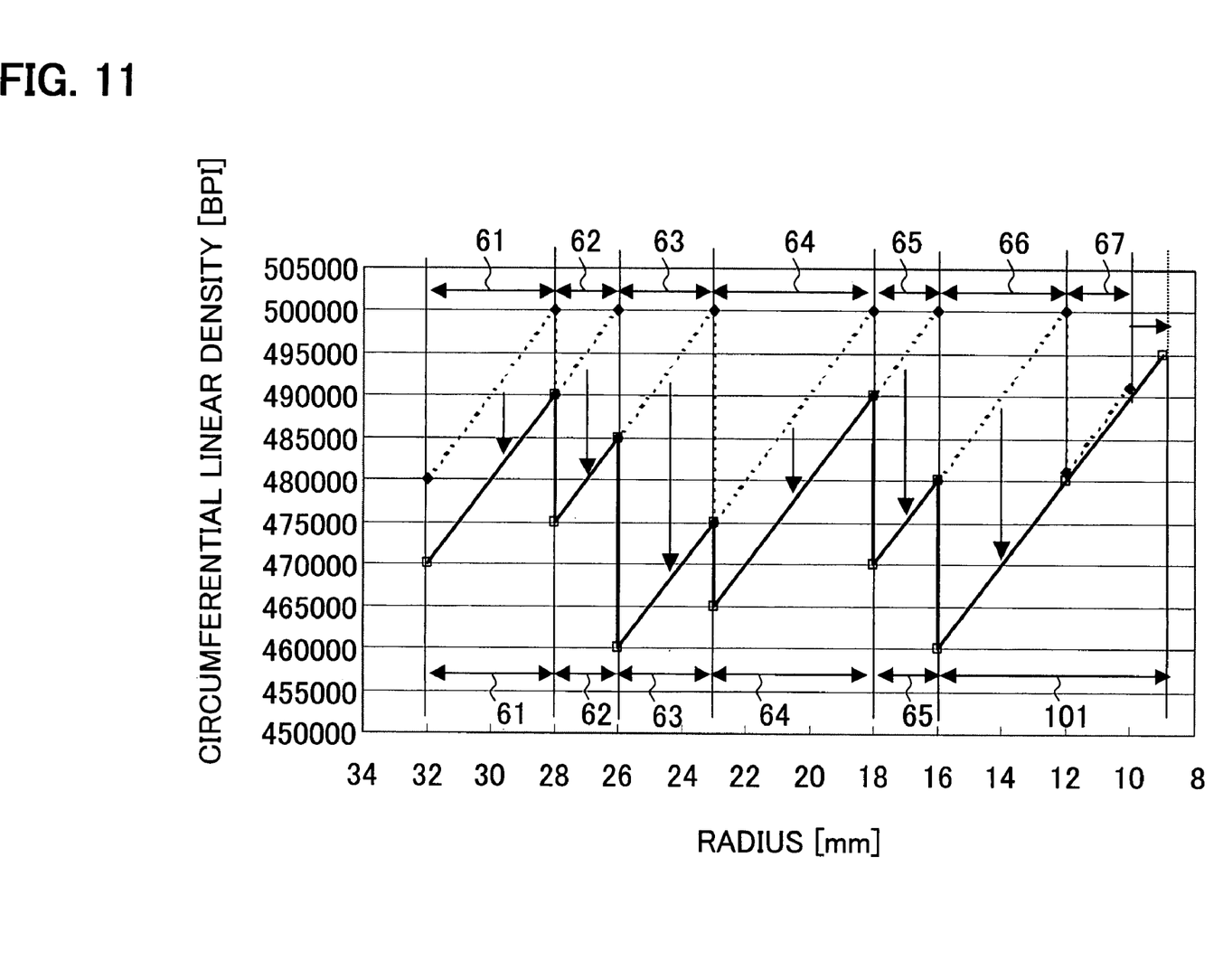
FIG. 11 shows an example of recording linear density distribution the third employment mode.

In order to explain how the zone allocation shown in FIG. 9 is conducted, the explanation will be conducted with reference to FIG. 10 and FIG. 11.

FIG. 10 shows an example of the data recording area in the third employment mode. As shown in FIG. 10, the zone boundaries are not changed with respect to those in FIG. 6, except for the area where the data recording area on the inner side was expanded. Therefore, the fifth zone 65 is set in an area with a radius of from 16 mm to 18 mm, the fourth zone 64 is set in an area with a radius of from 18 mm to 23 mm, the third zone 63 is set in an area with a radius of from 23 mm to 26 mm, the second area 62 is set in an area with a radius of from 26 mm to 28 mm, and the first zone 61 is set in an area with a radius of from 28 mm to 32 mm, those settings being identical to those in FIG. 6. As a novel feature, a sixth zone 101 is set in the area with a radius of from 9 mm to 16 mm to match the area expanded on the inner side, as the seventh zone 67 and sixth zone 66 that were set as shown in FIG. 6.

FIG. 11 shows an example of the recording linear density distribution in the third employment mode. The dotted line represents the recording linear density that is set for the zone boundaries shown in FIG. 6 and the solid line represents the recording linear density that is set for the zone boundaries shown in FIG. 10. As shown in FIG. 11, the data recording area on the spindle side was expanded by 1 mm and the boundaries of each zone were reset. As a result, the maximum value of the recording linear density that has to be attained in each zone is decreased from 500,000 BPI (Bit Per Inch) to 495,000 BPI.

As shown in FIG. 11, the recording angular density is shifted in one inner zone, but the prescribed capacity is sometimes also attained by using the recording angular density of two or more inner zones.

In the third employment mode, the recording boundary of the head is measured for each disk device, the data recording area is expanded, and the recording angular density of each zone is shifted in one zone on the inner side, thereby decreasing the recording linear (angular) density that has to be attained by the head to ensure the prescribed capacity. As a result, the degradation of the head production yield can be prevented.

Further, the first, second, and third employment modes illustrate the examples of area expansion toward the inner peripheral side (spindle side), but separate setting of recording areas can be also conducted in the case of area expansion to the outer peripheral side and area expansion to the inner peripheral side and outer peripheral side.

INDUSTRIAL APPLICABILITY

As described hereinabove, with the present invention the data recording area can be expanded by using extra areas on the magnetic recording medium. Therefore, the recording capacity of a magnetic disk device can be increased. Furthermore, the expansion of data recording area makes it possible to decrease the recording linear density that is set to attain the prescribed capacity to a level below that before the expansion of the data recording area and the degradation of yield caused by the head can be prevented.

The invention claimed is:

1. A disk device comprising:
   a disk medium having set therein a recording area divided by zone boundaries into a plurality of zones in the radial direction;
   a head moving over said disk medium and reading or writing data from or on said disk medium; and
   a controller measuring an inner recording boundary and an outer recording boundary indicating recording boundaries of said head,
   wherein, when the movability range of said head which is an area surrounded by said inner recording boundary and said outer recording boundary is wider than said set recording area, the recording area in said disk medium is expanded and new zone boundaries are set, and
   wherein the recording frequency of the outer peripheral zone is equal to or higher than the recording frequency of the inner peripheral zone, and when the movability range of said head is wider on the inner peripheral side than said set recording area, said zone boundaries are shifted to the outer peripheral side.

2. An array of a plurality of disk devices,
   wherein each disk device comprises a disk medium having set therein a recording area divided in the radial direction by zone boundaries into a plurality of zones each including a plurality of tracks, and a head reading or writing data from or on said disk medium,
   wherein a recording area of the n-th (n is a natural number) zone from the innermost peripheral side of the disk medium in the first disk device contained in said plurality of disk devices is expanded, and the number of tracks of the n-th zone is larger than the number of tracks in the n-th zone from the innermost peripheral side of the disk medium in the second disk device contained in said plurality of disk devices, and
   wherein the movability range of the head in said first disk device is wider than the movability range of the head in said second disk device.

3. The array of disk devices according to claim 2, wherein the number of tracks in the innermost peripheral zone in said first disk device is larger than the number of tracks in the innermost peripheral zone in said second disk device.

4. A method for manufacturing a disk device comprising a disk medium having set therein a recording area divided by zone boundaries into a plurality of zones in the radial direction, and a head moving over said disk medium and reading or writing data from or on said disk medium, comprising the steps of:
   measuring an inner recording boundary and an outer recording boundary indicating recording boundaries of said head; expanding the recording area of said disk medium when a movability range which is an area surrounded by said inner recording boundary and said outer recording boundary is wider than a standard value;

setting new zone boundaries; and shifting said zone boundaries to the outer peripheral side when the recording frequency of the outer peripheral zone is equal to or higher than the recording frequency of the inner peripheral zone, and when the movability range of said head is wider on the inner peripheral side than said set recording area.

* * * * *